(12) United States Patent
Mu

(10) Patent No.: US 8,204,947 B2
(45) Date of Patent: Jun. 19, 2012

(54) METHOD, SYSTEM AND SERVER FOR POPPING E-MAIL

(75) Inventor: Tianshi Mu, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 203 days.

(21) Appl. No.: 12/725,559

(22) Filed: Mar. 17, 2010

(65) Prior Publication Data

US 2010/0174798 A1 Jul. 8, 2010

Related U.S. Application Data

(63) Continuation of application No. PCT/CN2008/072186, filed on Aug. 28, 2008.

(30) Foreign Application Priority Data

Sep. 19, 2007 (CN) .......................... 2007 1 0154174

(51) Int. Cl.
*G06F 15/16* (2006.01)

(52) U.S. Cl. ...................................... 709/206; 709/203

(58) Field of Classification Search ................... 709/206
See application file for complete search history.

(56) References Cited

U.S. PATENT DOCUMENTS

| 8,028,060 | B1 * | 9/2011 | Wyld et al. ..................... 709/224 |
| 2002/0111990 | A1 * | 8/2002 | Wood et al. .................... 709/203 |
| 2006/0277257 | A1 | 12/2006 | Kromann et al. |
| 2008/0155028 | A1 * | 6/2008 | Martin et al. ................. 709/206 |
| 2009/0006570 | A1 * | 1/2009 | Forstall et al. ................ 709/206 |

FOREIGN PATENT DOCUMENTS

| CN | 1670741 A | 9/2005 |
| CN | 1864399 A | 11/2006 |
| WO | WO-2004/030308 A1 | 4/2004 |

* cited by examiner

*Primary Examiner* — Glenton B Burgess
*Assistant Examiner* — Angela Nguyen
(74) *Attorney, Agent, or Firm* — Marshall, Gerstein & Borun LLP

(57) ABSTRACT

A method for popping an E-mail is disclosed, the method includes: obtaining a mail popping parameter of a first mailbox; determining whether the mail popping parameter meets a mail popping rule of the first mailbox; triggering to pop an E-mail of the first mailbox according to information of the first mailbox when the mail popping parameter meets the mail popping rule of the first mailbox; popping the E-mail of the first mailbox into a mail server corresponding to a second mailbox according to the information of the first mailbox. A system and server for popping an E-mail is also disclosed. By embodiments of the present invention, the E-mail of the first mailbox can be popped into the second mailbox automatically without the participation of a user, so that the user can receive the E-mail of the first mailbox through the second mailbox without waiting after logging on the second mailbox.

19 Claims, 5 Drawing Sheets

US 8,204,947 B2

METHOD, SYSTEM AND SERVER FOR POPPING E-MAIL

CROSS-REFERENCE TO RELATED APPLICATIONS

This is a continuation of International Application No. PCT/CN2008/072186, filed Aug. 28, 2008, which in turn claims the priority benefit of Chinese Patent Application No. 200710154174.3 filed Sep. 19, 2007, the entire respective disclosures of which are incorporated herein by reference.

FIELD OF THE INVENTION

The present invention relates to network technologies, and more particularly, to a method, system and server for popping an Electronic mail (E-mail).

BACKGROUND OF THE INVENTION

E-mail is a communication mode providing information interaction by using an electronic means. Through an E-mail system, a user can rapidly send an E-mail to a network user at any location in the world.

Most users have more than one mailbox for receiving and sending an E-mail, and a typical format of a mailbox address is abc@xxxxx.xxx. The "abc" before the "@" refers to a character combination or a code which is set by a user when the user applies the mailbox, and the "xxxxx.xxx" following the "@" refers to a name of a service provider providing an E-mail service to the user, e.g. user@qq.com.

In order to facilitate a user to receive and send E-mails of multiple mailboxes, most service providers providing E-mail services set a POP service for mailboxes. The user may pop E-mails of multiple mailboxes into one mailbox through the POP service. For example, the user has three mailboxes A, B and C which all can provide the POP service, and through any one of the three mailboxes, the user can receive E-mails of the other two mailboxes.

FIG. 1 shows a conventional system for implementing a POP service. In this system, an E-mail of a mailbox B can be popped into a mailbox A. The system includes a POP agent server 101, a mail server A 102 for providing the mailbox A with an E-mail service, and a mail server B 103 for providing the mailbox B with an E-mail service.

In order to pop the E-mail of the mailbox B into the mailbox A, a user needs to configure information of the mailbox B, e.g. an address of the mailbox B, a password for logging on the mailbox B and an address of the mail server B, through a POP service configuring page provided by the mailbox A. After being configured, the information of the mailbox B is stored in the mail server A. Usually, the address of a mail server for providing the POP service is pop.xxxxx.xxx or pop3.xxxx.xxx.

The user logs on the mailbox A through a client, clicks a pop button which is provided by the mailbox A and is used for popping the E-mail of the mailbox B, a message containing the information of the mailbox B is sent to the POP agent server 101. The POP agent server 101 establishes a connection with the mail server B 103 according to the information of the mailbox B, and pops the E-mail of the mailbox B into the mailbox A.

In the prior art, the POP agent server 101 can not be trigged to pop the E-mail of the mailbox B into the mailbox A unless the user logs on the mailbox A and clicks the pop button which is provided by the mailbox A and is used for popping the E-mail of the mail B. In this way, after logging on the mailbox A, the user has to wait until the mailbox A receives the E-mail of the mailbox B. In addition, when the POP agent server 101 and the mail server B 103 perform information interaction, if network congestion occurs or the mail server B 103 fails, the POP agent server 101 can not pop the E-mail of the mailbox B into the mailbox A. Further, if the mailbox A can not receive the E-mail of the mailbox B for a long time, the user can not perform a web operation for the mailbox A for a long time, which affects the user to use the mailbox A and results in that the mailbox A logged by the user quits because of overtime.

SUMMARY OF THE INVENTION

Embodiments of the present invention provide a method, system and server for popping an E-mail, by which a POP service can be implemented without the participation of a user.

A method for popping an E-mail includes:
obtaining a mail popping parameter of a first mailbox;
determining whether the mail popping parameter meets a mail popping rule of the first mailbox;
triggering to pop an E-mail of the first mailbox according to information of the first mailbox when the mail popping parameter meets the mail popping rule of the first mailbox; and
popping the E-mail of the first mailbox into a mail server corresponding to a second mailbox according to the information of the first mailbox.

A system for popping an E-mail includes:
a POP automatic server, adapted to obtain a mail popping parameter of a first mailbox, determine whether the mail popping parameter meets a mail popping rule of the first mailbox, and sending a trigger command containing information of the first mailbox when the mail popping parameter meets the mail popping rule of the first mailbox; and
a POP agent server, adapted to pop an E-mail of the first mailbox according to the triggering command and the information of the first mailbox, and store the E-mail of the first mailbox in a mail server corresponding to a second mailbox.

A server for popping an E-mail includes:
a mailbox information storing module, adapted to store information of a first mailbox, and set a mail popping rule of the first mailbox;
a mail parameter obtaining module, adapted to obtain a mail popping parameter of the first mailbox;
a determining module, adapted to determine whether the mail popping parameter meets the mail popping rule of the first mailbox, and send an executing command when the mail popping parameter meets the mail popping rule of the first mailbox; and
a message sending module, adapted to receive the executing command, obtain the information of the first mailbox, and trigger a POP agent server corresponding to a second mailbox to pop an E-mail of the first mailbox by sending a triggering command containing the information of the first mailbox.

As can be seen from the above technical schemes, the POP automatic server obtains the mail popping parameter of the first mailbox, and determines whether the mail popping parameter meets the mail popping rule of the first mailbox; if the mail popping parameter meets the mail popping rule of the first mailbox, the POP automatic server sends a message containing the information of the first mailbox to the POP agent server so as to trigger the POP agent server to pop the E-mail of the first mailbox into the second mail server corresponding to the second mailbox, so that the second mail server providing an E-mail service for the second mailbox pops the E-mail of the first mailbox into the second mail server automatically without the participation of the user before the user logs on the second mailbox. In this way, after logging on the second mailbox, the user can receive the E-mail of the first mailbox in the second mailbox without waiting. Moreover, after the user logs on the second mailbox, the POP agent server and the second mail server do not need to perform information interaction, so the procedure of popping the E-mail of the first mailbox does not affect the user to use the second mailbox.

DETAILED DESCRIPTION OF THE INVENTION

The embodiments of the present invention provide a method, system and server for popping an E-mail, by which a POP service can be implemented without the participation of a user. In the embodiments of the present invention, the POP service refers to a service for receiving E-mails in other mailboxes through one mailbox.

The mailbox in the embodiments of the present invention is a mailbox which can provide a POP service, i.e. a mail server providing an E-mail service for the mailbox supports the POP service.

Figure 1:
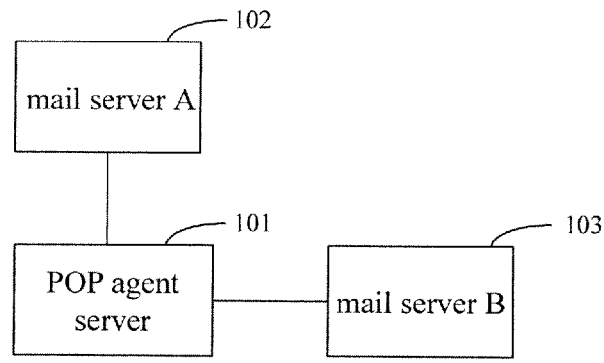
FIG. 1 is a schematic diagram illustrating a mail system for implementing a POP service in the prior art.
Figure 2:
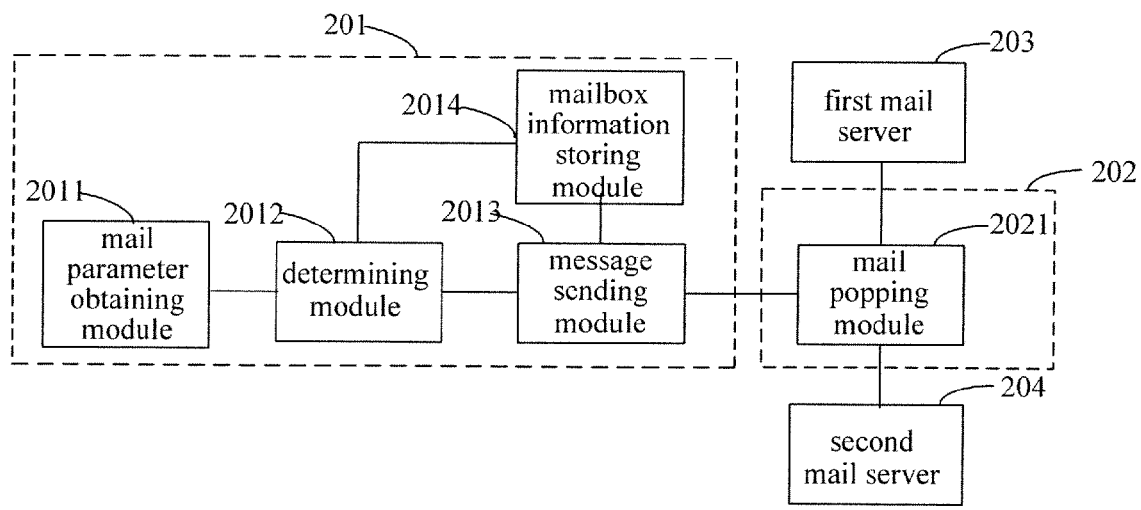
FIG. 2 is a schematic diagram illustrating a system for popping an E-mail in accordance with a first embodiment of the present invention.

FIG. 2 is a schematic diagram illustrating a system for popping an E-mail in accordance with a first embodiment of the present invention. As shown in FIG. 2, the system includes: a POP automatic server 201 and a POP agent server 202. In this system, an E-mail of a first mailbox can be popped into a second mailbox.

A first mail server 203 is adapted to provide an E-mail service for the first mailbox, and the E-mail of the first mailbox is stored in the first mail server 203. A second mail server 204 is adapted to provide an E-mail service for the second mailbox, and the E-mail of the second mailbox is stored in the second mail server 204.

In order to pop the E-mail of the first mailbox into the second mailbox, a user needs to log on the second mailbox through a client in advance, and configures information of the first mailbox on a POP service configuring page provided by the second mailbox, e.g. configures an address of the first mailbox, a password for logging on the first mailbox and an address of the first mail server. After the user writes and confirms the information of the first mailbox on the POP service configuring page, the client sends the information of the first mailbox to the POP automatic server 201, and the POP automatic server 201 stores the information of the first mailbox. When receiving the information of the first mailbox, the POP automatic server 201 set a mail popping rule for the first mailbox.

As shown in FIG. 2, the POP automatic server 201 includes a mail parameter obtaining module 2011, a determining module 2012, a message sending module 2013 and a mailbox information storing module 2014. The POP agent server 202 includes a mail popping module 2021.

The mailbox information storing module 2014 is adapted to receive and store the information of the first mailbox, and set the mail popping rule of the first mailbox. In this embodiment, the information of the first mailbox includes an address of the first mailbox, a password for logging on the first mailbox and an address of the first mail server. In addition, the mailbox information storing module 2014 may set a default mail popping rule for the first mailbox, or set a mail popping rule corresponding to user requirements of the first mailbox.

The mail parameter obtaining module 2011 is adapted to obtain a mail popping parameter of the first mailbox.

The determining module is adapted to determine whether the mail popping parameter meets the mail popping rule of the first mailbox, and send an executing command to the message sending module 2013 if the mail popping parameter meets the mail popping rule of the first mailbox.

The message sending module 2013 is adapted to obtain the information of the first mailbox from the mailbox information storing module 2014, and send a triggering command containing the information of the first mailbox to the mail popping module 2021.

The mail popping module 2021 is adapted to establish a connection with the first mail server according to the information of the first mailbox, and pop the E-mail of the first mailbox into the second mail server corresponding to the second mailbox.

In the embodiment of the present invention, the POP agent server 202 communicates with the first mail server 203 and the second mail server 204 through a POP2 protocol or a POP3 protocol. The POP agent server 202 may also communicate with the first mail server 203 and the second mail server 204 through other mail communication protocols, which does not affect the implementation of the embodiment of the present invention.

The foregoing is the system for popping an E-mail provided by the first embodiment of the present invention. When applying the embodiment of the present invention, the skilled person in the art may set different mail popping rules in the POP automatic server 201 according to requirements of different mail systems, e.g. the mail popping rule may be to pop an E-mail at a periodic or non-periodic interval, or pop an E-mail when the network is idle.

The system for popping an E-mail provided by the first embodiment of the present invention will be described with reference to different implementation modes.

A first implementation mode: the mail popping rule set for the first mailbox is to pop an E-mail periodically every first time interval T1, and the mail popping parameter of the first mailbox is a timing time. The timing time is increased from 0 when the E-mail starts to be popped.

In the first implementation mode, the mail parameter obtaining module 2011 is adapted to obtain the timing time of the first mailbox. The determining module 2012 is adapted to determine whether the timing time equals to T1, and send the executing command to the message sending module 2013 when the timing time equals to T1.

In practical applications, the functions of the mail parameter obtaining module 2011 and the determining module 2012 may be implemented by a timer. When receiving the information of the first mail, the mail information storing module 2014 triggers the timer to start to time the first mailbox, and then the determining module 2012 triggers the message sending module 2013 when the timing time equals to T1. For example, if the mail popping rule set for the first mailbox is to pop the E-mail from the first mailbox every 48 hours, the determining module 2012 triggers the message sending module when the timer goes for 48 hours.

When the second mail server provides a mailbox service for multiple users, or a user receives E-mails of multiple mailboxes through the second mailbox, it is needed to set multiple timers for timing multiple mailboxes. The mail popping procedure of each mailbox is the same as the above procedure, and will not be described.

A second implementation mode: the mail popping rule set for the first mailbox is to pop the E-mail of the first mailbox when the network is idle, the mail popping parameter of the first mailbox is data flux in the network, and the mail parameter obtaining module 2011 is adapted to monitor the data flux in the network.

In the second implementation mode, the determining module 2012 is adapted to compare the data flux in the network with a preset data flux threshold, determine whether the network is idle, and send the executing command to the message sending module 2013 if the network is idle, i.e. the data flux in the network is smaller than the preset data flux threshold.

A third implementation mode: the mail popping rule set for the first mailbox is to pop the E-mail periodically every first time interval T1, e.g. to pop the E-mail every 48 hours, i.e. the first time interval T1 equals to 48 hours. The mail popping parameter of the first mailbox includes mail popping time Nextpoptime and a mail popping identity Checkonly. The mail popping time Nextpoptime equals to the last mail popping time plus the first time interval T1, and the initial value of the mail popping time Nextpoptime is preset. The Checkonly indicates whether the E-mail has been popped from the first mailbox; if the Checkonly equals to 0, it is indicated that the E-mail has not been popped from the first mailbox; if the Checkonly equals to 1, it s indicated that the E-mail has been popped from the first mailbox, vice verse.

In the third implementation mode, the POP automatic server 201 may be used when E-mails are popped from multiple mailboxes. For example, the second mail server provides the E-mail service for multiple users, or a user receives E-mails of multiple mailboxes through the second mailbox. The present invention will be described hereinafter by taking an example that the POP automatic server 201 is used when the E-mail is popped from the first mailbox.

The mail parameter obtaining module 2011 is adapted to obtain the mail popping time Nextpoptime and the mail popping identity Checkonly of the first mailbox every second time interval T2.

In the embodiment of the present invention, T2 can be set as 20 seconds. When E-mails are popped from multiple mailboxes, E-mails of multiple mailboxes are popped in turn from the first mailbox under the control of the POP automatic server 201. At this time, T2 refers to a time interval between the time of popping an E-mail of the last mailbox in multiple mailboxes and the time of starting to pop an E-mail from the first mailbox again.

The determining module 2012 is adapted to determine whether the mail popping time Nextpoptime is earlier than the current time of the system and whether the Checkonly equals to 0; if the mail popping time Nextpoptime is earlier than the current time of the system and the Checkonly equals to 0, the determining module 2012 is adapted to send the executing command to the message sending module 2013; otherwise, the mail parameter obtaining module 2011 obtains a mail popping parameter of the next mailbox.

Figure 6:
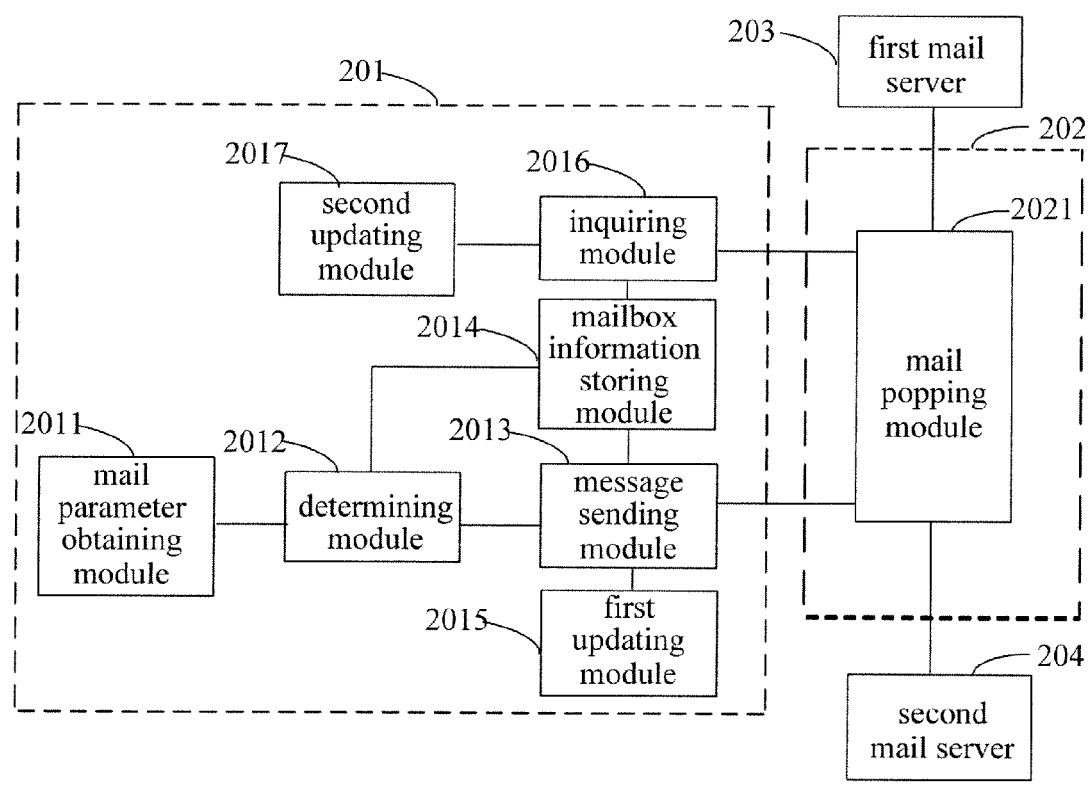
FIG. 6 is a schematic diagram illustrating a system for popping an E-mail in accordance with a fifth embodiment of the present invention.

FIG. 6 is a schematic diagram illustrating a system for popping an E-mail in accordance with a fifth embodiment of the present invention. As shown in FIG. 6, in the third implementation mode, the POP automatic server 201 further includes a first updating module 2015, an inquiring module 2016 and a second updating module 2017.

The first updating module 2015 updates Checkonly=0 into Checkonly=1 after the message sending module 2013 sends the message containing the information of the first mailbox to the mail popping module 2021.

The inquiring module adapted to send a message to the mail popping module 2021, inquire whether the mail popping module 2021 has popped the E-mail of the first mailbox; if the mail popping module 2021 has popped the E-mail of the first mailbox, the inquiring module is adapted to send an updating command to the second updating module; if the mail popping module 2021 has not popped the E-mail of the first mailbox, the inquiring module is adapted to inquire a mail popping result of the first mailbox at a third time interval T3, e.g. a 10 minutes, until that the mail popping module 2021 pops the E-mail of the first mailbox. The number of the popped E-mails may be 0.

The second updating module is adapted to set the mail popping time of the first mailbox as Nextpoptime plus T1, and set Checkonly=1 as Checkonly=0.

In the embodiment of the present invention, a frequency access limiting mechanism can be adopted to limit the times of visiting the first mailbox, or an timeout mechanism is adopted to limit the time of popping the E-mail, so as to avoid a case that the time of popping the E-mail of the first mailbox is too long, even larger than T1.

In the third implementation mode, the POP automatic server 201 inquires the mail popping parameters of all mailboxes in turn; if the mail popping parameter of a mailbox meets the mail popping rule of the mailbox, the E-mail of the mailbox is popped; if the mail popping parameter of the mailbox does not meet the mail popping rule of the mailbox, the POP automatic server 201 inquires the next mailbox, until inquiring all mailboxes.

A fourth implementation mode: the E-mail is popped by using a queue managing mechanism.

In the fourth implementation mode, the E-mails are popped from multiple mailboxes under the control of the POP automatic server 201. For example, the second mail server provides an E-mail service for multiple users, or a user receives E-mails of multiple mailboxes through the second mailbox.

The difference between the fourth implementation mode and the third implementation mode includes that: in the fourth implementation mode the POP automatic server does not inquire all mailboxes in turn, but inquires all mailboxes for one time and selects mailboxes whose mail popping parameters meet respective mail popping rules, and then triggers the POP agent server to pop the E-mails of the selected mailboxes.

Suppose that the POP automatic server 201 store information of M mailboxes, M is an integer larger than 0, the POP agent server 202 needs to pop the E-mails of the M mailboxes into the second mail server 204.

The POP automatic server 201 polls the M mailboxes and selects N mailboxes from the M mailboxes every second time interval T2. The N mailboxes must meet a condition that the mail popping time Nextpoptime of the N mailboxes is earlier than the current time of the system and the Checkonly of the N mailboxes equals to 0.

The POP automatic server 201 sends a message containing information of the N mailboxes to the POP agent server 202, and triggers the POP agent server 202 to pop the E-mails of the N mailboxes into the second mail server 204.

After triggering the POP agent server 202 to pop the E-mails, the POP automatic server 201 sets the Checkonly of the N mailboxes as 1, and updates the Nextpoptime into Nextpoptime plus a third time interval T3.

The POP automatic server 201 polls the M mailboxes every time interval T3, selects a mailbox whose Checkonly equals to 1 and Nextpoptime is earlier than the current time of the system, and inquires whether the POP agent server 202 has popped an E-mail of the mailbox.

If the POP agent server 202 has popped the E-mail of the mailbox, the POP automatic server 201 updates the Nextpoptime of the mailbox into Nextpoptime plus a first time interval T1 and updates the Checkonly into 0. In the embodiment of the present invention, if the number of the E-mail popped by the POP agent server 202 is 0, it is deemed that the POP agent server 202 has popped the E-mail of the mailbox.

If the POP agent server 202 has not popped an E-mail from the mailbox, i.e. the interaction between the POP agent server 202 and a third party mail server providing an E-mail service for the mailbox is not finished, e.g. pop3 interaction is not finished, the POP automatic server 201 updates the Nextpoptime of the mailbox into Nextpoptime plus the third time interval T3, so that the Nextpoptime of the mailbox is still earlier than the current time of the system when the POP automatic server 201 polls the mailbox again, thereby the mailbox can be polled every third interval T3.

In addition, in order to make the mailbox can be polled every time interval T3, the POP automatic server 201 may not update the Nextpoptime after the POP automatic server 201 triggers the POP agent server to pop the E-mail, but selects a mailbox whose Checkonly equals to 1 when polling the M mailboxes every third time interval T3, so that the POP automatic server 201 can inquire, every third time interval T3, whether the POP agent server 202 has popped the E-mail of the mailbox after the POP agent server 202 pops the E-mail of the mailbox.

When the POP automatic server 201 stores information of a large number of mailboxes, i.e. the value of M is large, the POP automatic server 201 may select information of N mailboxes orderly every time, and the Nextpoptime of the N mailboxes is earlier than the current time of the system. Hereafter, according to the Checkonly of the N mailboxes, the POP agent server 202 pops E-mails of the N mailboxes.

When the Checkonly of a mailbox equal to 0, the POP automatic server 201 sends a message containing information of the mailbox to the POP agent server 202, triggers the POP agent server 202 to pop the E-mail of the mailbox into the second mail server 204, sets Checkonly of the N mailboxes as 1, and updates the Nextpoptime as Nextpoptime plus the third time interval T3.

When the Checkonly of the mailbox equals to 1, the POP automatic server 201 inquires whether the POP agent server 202 has popped the E-mail of the mailbox. If the POP agent server 202 has popped the E-mail of the mailbox, the POP automatic server 201 updates the Nextpoptime of the mailbox into Nextpoptime plus the first time interval T1, and updates the Checkonly into 0. If the POP agent server 202 has not popped the E-mail of the mailbox, the POP automatic server 201 updates the Nextpoptime of the mailbox into Nextpoptime plus the third time interval T3, so that the Nextpoptime of the mailbox is still earlier than the current time of the system when the POP automatic server 201 polls the mailbox again.

In the above four implementation modes, the information of the mailbox set by the user, e.g. the address of the mailbox, the password for logging on the mailbox, the address of the mail server and the mail popping rule of the mailbox, are stored in the POP automatic server 201.

Figure 3:
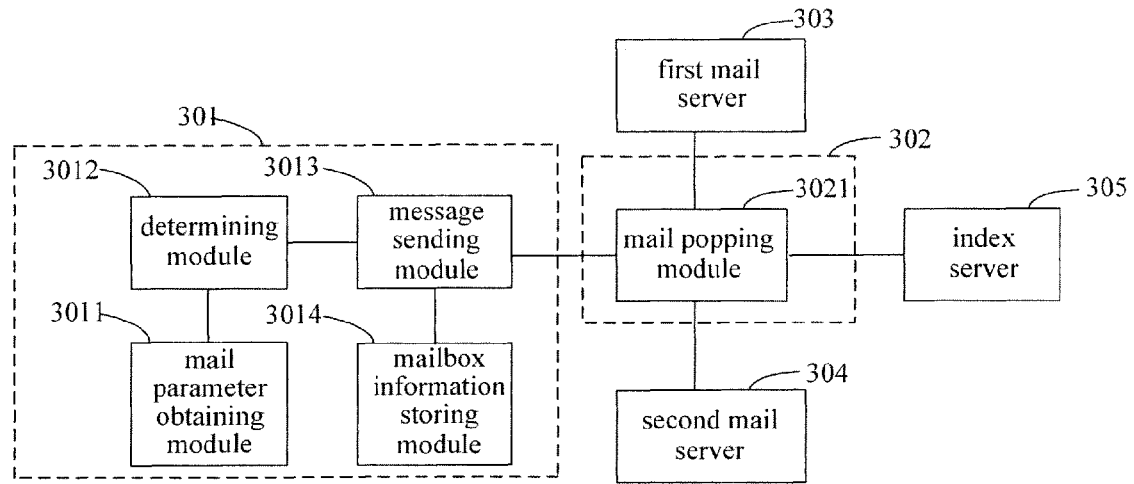
FIG. 3 is a schematic diagram illustrating a system for popping an E-mail in accordance with a second embodiment of the present invention.

FIG. 3 is a schematic diagram illustrating a system for popping an E-mail in accordance with a second embodiment of the present invention. In this embodiment, a POP automatic server 301 only stores an address of a mailbox set by a user. As shown in FIG. 3, compared with the second embodiment, an index server 305 is added in this embodiment.

The index server 305 is adapted to store information of the mailbox preset by the user. The information of the mailbox in this embodiment includes the address of the mailbox, the password for logging on the mailbox and the address of the mail server.

A mailbox information storing module 3014 is adapted to store the address of the mailbox and a mail popping rule of the mailbox.

A massage sending module 3013 is adapted to send a message containing the information of the mailbox to a mail popping module 3021. In this embodiment, the information of the mailbox sent by the message sending module 3013 only includes the address of the mailbox.

The mail popping module 3021 is adapted to search for the password for logging on the mailbox and the address of the mail server in the index server 305, establish a connection with the mail server corresponding to the mailbox according to the address of the mailbox, the password for logging on the mailbox and the address of the mail server, and pop the E-mail of the mailbox into a second mail server 304 corresponding to the second mailbox.

The system in the embodiment of the present invention may adjust the mail popping rule of the mailbox according to a mail popping result of the mailbox. For example, when the second mail server provides an E-mail service for multiple mailboxes or a user receives E-mails of multiple mailboxes through the second mailbox, mail popping results of the mailboxes are different, so a mail popping rule suiting for the user can be set by adjusting the mail popping rule, so as to provide a better service for the user.

Figure 7:
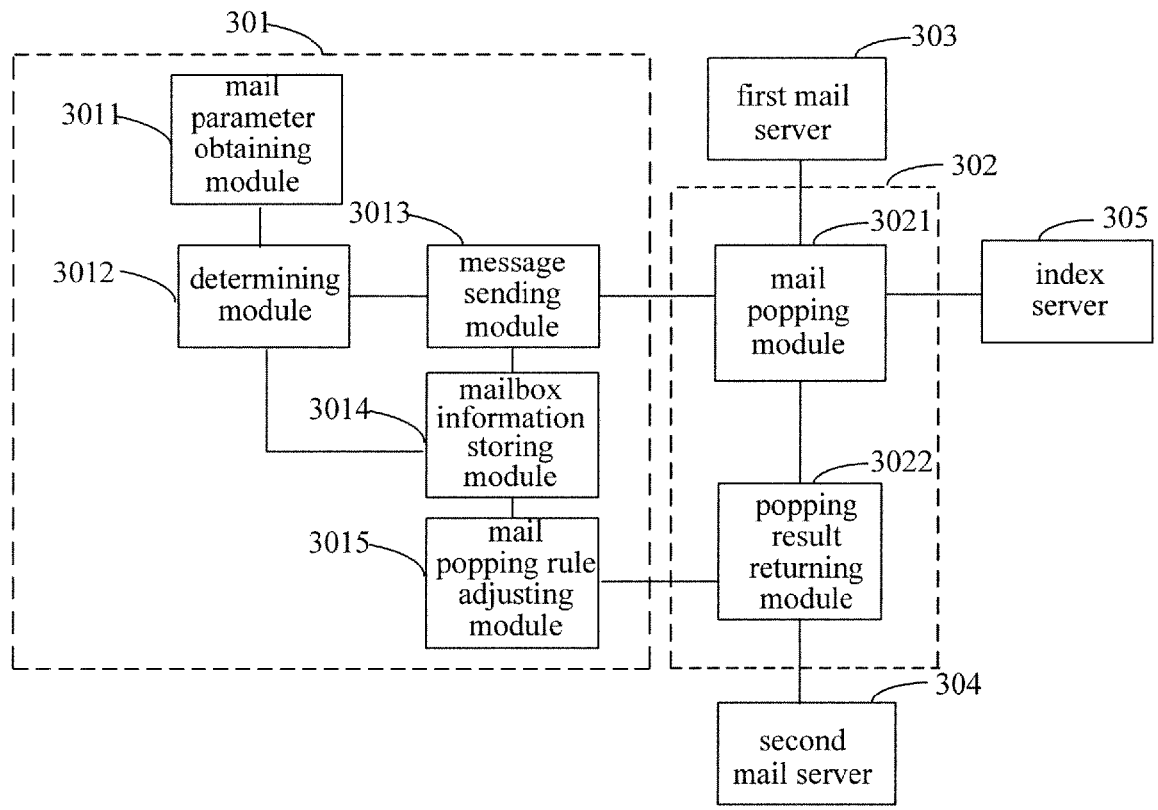
FIG. 7 is a schematic diagram illustrating a method for popping an E-mail in accordance with a sixth embodiment of the present invention.

FIG. 7 is a schematic diagram illustrating a system for popping an E-mail in accordance with a sixth embodiment of the present invention. As shown in FIG. 7, when the system in the embodiment of the present invention may adjust a mail popping rule of a mailbox according to a mail popping result of the mailbox, the POP agent server in this system further includes a popping result returning module 3022, and the POP automatic server further includes a mail popping rule adjusting module 3015.

The popping result returning module 3022 is adapted to send the mail popping result of the mailbox to the mail popping rule adjusting module 3015.

The mail popping rule adjusting module 3015 is adapted to determine whether the mail popping result meets a condition of adjusting the mail popping rule, and adjust the mail popping rule of the mailbox if the mail popping result meets the condition of adjusting the mail popping rule. After the mail popping rule is adjusted, the system for popping the E-mail pops an E-mail according to the new mail popping rule.

With reference to the above third and fourth implementation modes, an implementation mode of a system for popping an E-mail which can adjust the mail popping rule is described. The difference between the implementation mode and the above implementation modes includes that:

When determining that the mail popping result meets the condition of adjusting the mail popping rule, the mail popping rule adjusting module 3015 adjusts the mail popping rule of the mailbox.

Correspondingly, the second updating module mentioned in the third implementation mode adjusts the mail popping time of the mailbox according to the new mail popping rule of the mailbox. For example, the preset mail popping time of the first mailbox is to pop an E-mail every 48 hours. When the mail popping result meets the condition of adjusting the mail popping rule, the mail popping rule adjusting module 3015 adjusts the mail popping rule of the first mailbox into popping an E-mail every 24 hours, and informs the second updating module to calculate the next pop time of the first mailbox according to the new mail popping rule, i.e. the next pop time equals to Nextpoptime plus 24 hours.

The preset condition of adjusting the mail popping rule and the procedure of adjusting the mail popping rule according to the condition will be described hereinafter with reference to a specific embodiment.

In this embodiment, a user has two mailboxes abc@qq.com and abc@QQ001.com, and a mail popping rule set initially by the user is to pop an E-mail of abc@QQ001.com into a mail server corresponding to abc@qq.com every 48 hours.

The preset condition of adjusting the mail popping rule includes that: if the number of the popped E-mails for the last two times equals to 0, the mail popping rule is not adjusted; if the number of the popped E-mails for the last two times is larger than 0, the mail popping rule is adjusted into popping the E-mail every 24 hours. The condition of adjusting the mail popping rule is stored in the POP automatic server.

When popping an E-mail, the mail popping rule adjusting module 3015 obtains an mail popping result of abc@QQ001.com from the popping result returning module 3022, i.e. the number of the popped E-mails, determines whether the number of the popped E-mails of abc@QQ001.com equals to 0, and records a determining result when the number of the popped E-mails does not equal to 0. When the number of the popped E-mails is larger than 0 for continuously two times, the mail popping rule adjusting module 3015 adjusts the mail popping rule into popping an E-mail every 24 hours.

When the mail popping rule is to pop an E-mail every 24 hours, the preset condition of adjusting the mail popping rule is that if the number of the popped E-mails is all 0 for continuously three times, the mail popping rule is adjusted into popping the E-mail every 48 hours; if the number of the popped E-mails is smaller than or equals to 2 and is larger than 0 for continuously three times, the mail popping rule is not adjusted; if the number of the popped E-mails is larger than 2 for continuously three times, the mail popping rule is adjusted into popping the E-mail every 12 hours.

The above condition of adjusting the mail popping rule is only a preferred example in this embodiment, and the skilled person in the art may set the condition of adjusting the mail popping rule according to requirements of different mail systems. For example, the mail popping result may be a mail popping success rate and a mail popping failure rate, and the condition of adjusting the mail popping rule may be set according to the mail popping success rate and the mail popping failure rate, which does not affect the implementation of the embodiment of the present invention.

In addition, in the embodiment of the present invention, the mail server for popping an E-mail, e.g. the second mail server, may send a message to an instant messaging server providing a service for an instant massaging soft after popping an E-mail, and may indicate that the second mailbox has received a new E-mail. The instant messaging server sends a mail prompt message to an instant messaging account corresponding to the second mailbox after receiving the message. In this way, after logging on the instant messaging soft or when using the second mailbox, a user of the second mailbox may receives the mail prompt message through the instant messaging soft.

In the embodiment of the present invention, the mail popping rule may also be that: when receiving a triggering command from the instant messaging server, the POP automatic server sends a message containing information of a mailbox to the POP agent server, and the POP agent server pops an E-mail. For example, the instant messaging server may send the triggering command after the user logs on the instant messaging soft. In this way, the instant messaging server triggers the POP agent server to pop an E-mail for the user after the user logs on the instant messaging soft.

In other embodiments of the present invention, the mail popping rules, e.g. popping an E-mail every 48 hours, popping an E-mail every 24 hours, etc., may be provided on a POP service configuring page so as to be selected by the user. In the embodiment of the present invention, the E-mails are popped under the control of the POP automatic server according to the mail popping rule selected by the user, which does not affect the implementation of the embodiment of the present invention.

In addition, in the embodiment of the present invention, if the mail popping failure rate of a mailbox is larger than a preset failure rate threshold, the POP agent server sends a message to the user to inform the user that the mail popping is wrong, and indicates the reason.

A method for popping an E-mail provided by the embodiment of the present invention will be described hereinafter with reference to the accompanying drawings.

The method for popping an E-mail provided by the embodiment of the present invention includes that: a POP automatic server obtains a mail popping parameter of a first mailbox, and determines whether the mail popping parameter meets a mail popping rule of the first mailbox; if the mail popping parameter meets the mail popping rule of the first mailbox, the POP automatic server sends a message containing information of the first mailbox to a POP agent server, and triggers the POP agent server to pop an E-mail of the first mailbox into a second mail server corresponding to a second mailbox.

Figure 4:
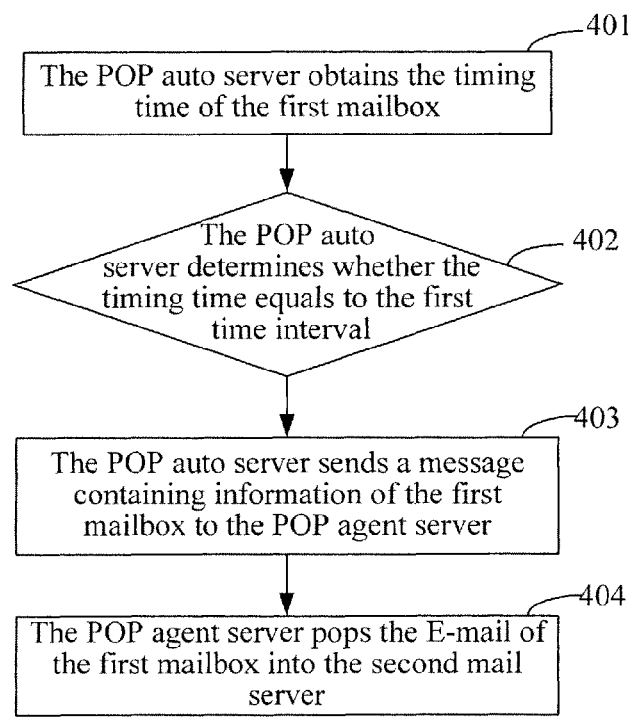
FIG. 4 is a schematic diagram illustrating a method for popping an E-mail in accordance with a third embodiment of the present invention.

FIG. 4 is a schematic diagram illustrating a method for popping an E-mail in accordance with a third embodiment of the present invention. The method is based on the above first implementation mode, the mail popping rule of the first mailbox is to pop an E-mail periodically every first time interval, and the mail popping parameter of the first mailbox includes a timing time. The method includes the following steps.

Step 401: The POP automatic server obtains the timing time of the first mailbox.

Step 402: The POP automatic server determines whether the timing time equals to the first time interval; if the timing time equals to the first time interval, Step 403 is performed, the timing time is reset, and timing is restarted; if the timing time does not equal to the first time interval, the procedure ends.

Step 403: The POP automatic server sends a message containing an address of the first mailbox, a password for logging on the first mailbox and an address of a first mail server to the POP agent server.

Step 404: The POP agent server establishes a connection with the first mailbox server according to the address of the first mailbox, the password for logging on the first mailbox and the address of the first mail server, and pops the E-mail of the first mailbox into a second mail server corresponding to the second mailbox.

Figure 5:
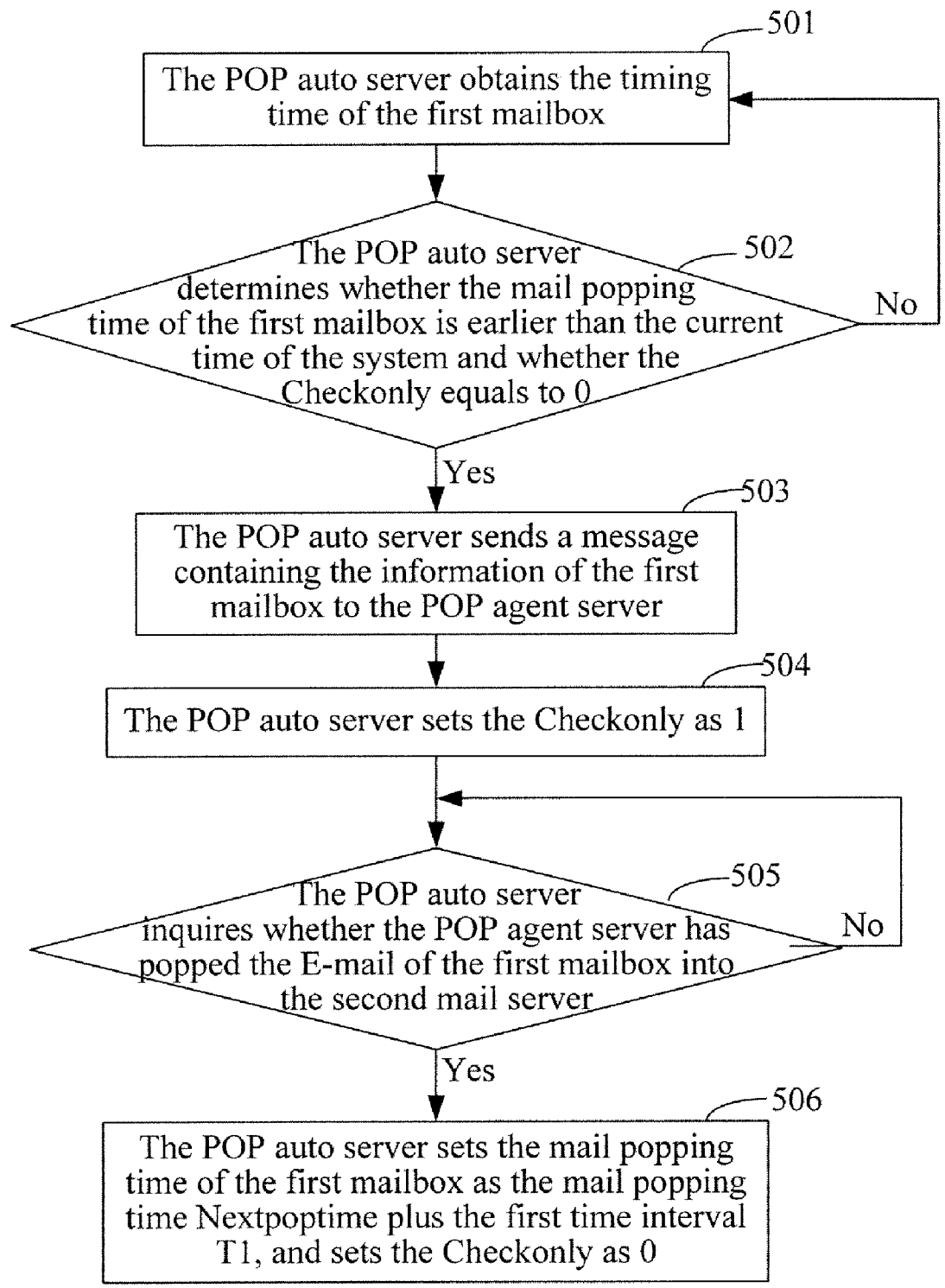
FIG. 5 is a schematic diagram illustrating a method for popping an E-mail in accordance with a fourth embodiment of the present invention.

FIG. 5 is a schematic diagram illustrating a method for popping an E-mail in accordance with a fourth embodiment of the present invention. The method is based on the above third implementation mode, the mail popping rule of the first mailbox is to pop an E-mail periodically every first time interval, and the mail popping parameter of the first mailbox includes mail popping time Nextpoptime and a mail popping identity Checkonly. The method includes the following steps.

Step 501: The POP automatic server obtains the mail popping time Nextpoptime and the mail popping identity Checkonly of the first mailbox every second time interval.

Step 502: The POP automatic server determines whether the mail popping time Nextpoptime of the first mailbox is earlier than the current time of the system and whether the Checkonly equals to 0; if the mail popping time Nextpoptime of the first mailbox is earlier than the current time of the system and the Checkonly equals to 0, Step 503 is performed; otherwise, the POP automatic server obtains a mail popping parameter of a next mailbox.

Step 503: The POP automatic server sends a message containing the address of the first mailbox, the password for logging on the first mailbox and the address of the first mail server to the POP agent server, so as to trigger the POP agent server to pop the Email of the first mailbox.

Step 504: The POP automatic server sets the Checkonly as 1.

Step 505: The POP automatic server inquires, at every third time interval, whether the POP agent server has popped the E-mail of the first mailbox into the second mail server; if the POP agent server has popped the E-mail of the first mailbox into the second mail server, Step 506 is performed; if the POP agent server has not popped the E-mail of the first mailbox into the second mail server, the POP automatic server inquires a mail popping result after the third time interval, until the E-mail of the first mailbox is popped into the second mail server.

Step 506: The POP automatic server sets the mail popping time of the first mailbox as the mail popping time Nextpoptime plus the first time interval T1, and sets the Checkonly as 0.

In a method provided by other embodiments of the present invention, the POP automatic server may also send a message containing the address of the first mailbox to the POP agent server. The POP agent server, according to the address of the first mailbox, searches for the password for logging on the first mailbox and the address of the first mail server in an index server used for storing mailbox information, which does not affect the implementation of the embodiment of the present invention.

In the embodiment of the present invention, in order to avoid that when the second mail server provides a service for multiple mailboxes or a user receives E-mails of multiple mailboxes through the second mailbox, the bandwidth of the second mail server is occupied excessively which affects other normal E-mail services, after the POP agent server pops the E-mail of the first mailbox into the second mail server, the method provided by the embodiment of the present invention further includes the follows.

The POP agent server returns the mail popping result of the first mailbox to the POP automatic server;

The POP automatic server determines whether the mail popping result meets a preset condition of adjusting the mail popping rule, and adjusts the mail popping rule of the first mailbox if the mail popping result meets the preset condition of adjusting the mail popping rule.

In specific implementation, the preset condition of adjusting the mail popping rule may be to adjust the mail popping rule if the number of the popped E-mails equals to a preset number of E-mails continuously for each of N times, and the mail popping result at least includes the number of the popped E-mails.

Correspondingly, the POP automatic server determining whether the mail popping result meets the preset condition of adjusting the mail popping rule includes the follows.

The POP automatic server compares the number of the popped E-mails with the preset number of E-mails; if the number of the popped E-mails reaches the preset number of E-mails, the POP automatic server records a determining result; if the POP automatic server records the determining result continuously for N times, the POP automatic server adjusts the mail popping rule of the first mailbox into popping the E-mail periodically every fourth time interval. When the mail popping rule is adjusted, the E-mails are popped according to the new mail popping rule.

In addition, after the POP agent server pops the E-mail of the first mailbox into the second mail server, the method further includes that:

the second mail server sends a message indicating that the second mailbox receives the E-mail to an instant messaging server, and the instant messaging server sends the message to an instant messaging account corresponding to the second mailbox.

The foregoing describes the methods and systems for popping an E-mail provided by the embodiments of the present invention. The skilled person in the art may modify the specific implementation mode and application scope of the present invention according to the idea of the embodiments of the present invention to adapt for the requirements of specific situations. Therefore, it should be understood that the specific implementation modes of the present invention described here are only preferred embodiments, and can not limit the protection scope of the present invention.

The invention claimed is:

1. A method for popping an E-mail, comprising:
   obtaining a mail popping parameter of a first mailbox;
   determining whether the mail popping parameter meets a mail popping rule of the first mailbox;
   triggering to pop an E-mail of the first mailbox according to information of the first mailbox when the mail popping parameter meets the mail popping rule of the first mailbox; and
   popping the E-mail of the first mailbox into a mail server corresponding to a second mailbox according to the information of the first mailbox;
   obtaining a mail popping result of the first mailbox;
   determining whether the mail popping result meets a preset condition of adjusting the mail popping rule; and
   adjusting the mail popping rule of the first mailbox when the mail popping result meets the preset condition of adjusting the mail popping rule, wherein
   the preset condition of adjusting the mail popping rule is to adjust the mail popping rule when the number of popped E-mails reaches a preset number of E-mails continuously for each of N times, wherein the mail popping result comprises the number of popped E-mails;
   wherein determining whether the mail popping result meets the preset condition of adjusting the mail popping rule comprises, recording a determining result when the number of the Popped E-mails is larger than or equal to the preset number of E-mails, and determining that the mail popping result meets the preset condition of adjusting the mail popping rule when recording the determining results continuously for N times.

2. The method of claim 1, wherein the mail popping rule is to pop the E-mail periodically every first time interval;

the mail popping parameter comprises a timing time; when triggering to pop the E-mail, the timing time is started from 0; and the mail popping parameter meeting the mail popping rule of the first mailbox comprises: the timing time equaling to the first time interval.

3. The method of claim 1, wherein the mail popping rule is to pop the E-mail when a network is idle;

the mail popping parameter comprises data flux in the network; and the mail popping parameter meeting a mail popping rule of the first mailbox comprises the data flux in the network being smaller than a preset data flux threshold.

4. The method of claim 1, wherein the mail popping rule is to pop the E-mail periodically every first time interval;

the mail popping parameter comprises mail popping time and a mail popping identity; an initial value of the mail popping time is set in advance and an increasing value of the mail popping time equals to the first time interval;

obtaining a mail popping parameter of a first mailbox comprises obtaining the mail popping parameter of the first mailbox every second time interval; and the mail popping parameter meeting a mail popping rule of the first mailbox comprises the mail popping time being earlier than a current time and the mail popping identity indicating that the E-mail is not popped from the first mailbox.

5. The method of claim 1, wherein the information of the first mailbox comprises an address of the first mailbox;

wherein popping the E-mail of the first mailbox according to the information of the first mailbox comprises searching for a password for logging on the first mailbox and an address of a first mail server corresponding to the first mailbox according to the address of the first mailbox, establishing a connection with the first mail server according to the address of the first mailbox, the password for logging on the first mailbox and the address of the first mail server, and starting to pop the E-mail of the first mailbox.

6. The method of claim 1, wherein the information of the first mailbox comprises an address of the first mailbox, a password for logging on the first mailbox and an address of a first mail server corresponding to the first mailbox;

wherein popping the E-mail of the first mailbox according to the information of the first mailbox comprises, establishing a connection with the first mail server according to the address of the first mailbox, the password for logging on the first mailbox and the address of the first mail server, and starting to pop the E-mail of the first mailbox.

7. The method of claim 4, further comprising:

setting the mail popping identity as indicating that the E-mail is being popped from the first mailbox after starting to pop the E-mail;

inquiring whether the E-mail has been popped from the first mailbox every third time interval; and setting the mail popping identity as indicating that the E-mail is not popped from the first mailbox after the E-mail has been popped from the first mailbox, and obtaining a next mail popping time by adding the first time interval to the mail popping time.

8. The method of claim 4, when there is more than one first mailbox, further comprising:

obtaining a mail popping parameter of a next first mailbox when a mail popping parameter of one of the more than one first mailbox does not meet the mail popping rule, or an E-mail of one of the more than one first mailbox is popped; or obtaining mail popping parameters of the more than one first mailbox when obtaining a mail popping parameter of one of the more than one first mailbox; and obtaining an E-mail of the first mailboxes whose mail popping parameter meets the mail popping rule when obtaining an E-mail of one of the more than one first mailbox.

9. A system for popping an E-mail, comprising:

a POP automatic server, adapted to obtain a mail popping parameter of a first mailbox, determine whether the mail popping parameter meets a mail popping rule of the first mailbox, and sending a trigger command containing information of the first mailbox when the mail popping parameter meets the mail popping rule of the first mailbox; and a POP agent server, adapted to pop an E-mail of the first mailbox according to the triggering command and the information of the first mailbox, and store the E-mail of the first mailbox in a mail server corresponding to a second mailbox;

wherein the POP agent server comprises a popping result returning module, adapted to send a mail popping result of the first mailbox; and wherein the POP automatic server comprises a mail popping rule adjusting module, adapted to determine whether the mail popping result meets a preset condition of adjusting the mail popping rule, and adjust the mail popping rule of the first mailbox when the mail popping result meets the preset condition of adjusting the mail popping rule;

wherein the preset condition of adjusting the mail popping rule is to adjust the mail popping rule when the number of popped E-mails reaches a preset number of E-mails continuously for each of N times; the mail popping result at least comprises the number of popped E-mails;

wherein determining whether the mail popping result meets a preset condition of adjusting the mail popping rule comprises, recording a determining result when the number of the Popped E-mails is larger than or equals to the preset number of E-mails, and determining that the mail popping result meets the preset condition of adjusting the mail popping rule when recording the determining results continuously for N times.

10. The system of claim 9, when the information of the first mailbox comprises an address of the first mailbox, further comprising:

an index server, adapted to store the address of the first mailbox, a password for logging on the first mailbox and an address of a first mail server; wherein the POP agent server is adapted to search for the password for logging on the first mailbox and the address of the first mail server in the index server according to the address of the first mailbox, establish a connection with the first mail server according to the address of the first mailbox, the password for logging on the first mailbox and the address of the first mail server, start to pop the E-mail of the first mailbox, and store the E-mail of the first mailbox in the mail server corresponding to the second mailbox.

11. The system of claim 9, wherein the POP automatic server comprises:
 a mailbox information storing module, adapted to store the information of the first mailbox and set the mail popping rule of the first mailbox;
 a mail parameter obtaining module, adapted to obtain the mail popping parameter of the first mailbox;
 a determining module, adapted to determine whether the mail popping parameter meets the mail popping rule of the first mailbox, and send an executing command when the mail popping parameter meets the mail popping rule of the first mailbox; and
 a message sending module, adapted to receive the executing command, obtain the information of the first mailbox, and send the triggering command containing the information of the first mailbox.

12. The system of claim 11, wherein when the mail popping rule is to pop the E-mail periodically every first time interval and the mail popping parameter comprises a timing time,
 the mail parameter obtaining module is adapted to obtain the timing time of the first mailbox; and
 the determining module is adapted to determine whether the timing time equals to the first time interval, and send the executing command when the timing time equals to the first time interval.

13. The system of claim 11, wherein when the mail popping rule is to pop the E-mail when a network is idle and the mail popping parameter comprises data flux in the network,
 the mail parameter obtaining module is adapted to obtain the data flux in the network; and
 the determining module is adapted to determine whether the data flux in the network is smaller than a present data flux threshold, and send the executing command when the data flux in the network is smaller than the present data flux threshold.

14. The system of claim 11, wherein when the mail popping rule is to pop the E-mail periodically every first time interval, and the mail popping parameter comprises mail popping time and a mail popping identity; an initial value of the mail popping time is set in advance and an increasing value of the mail popping time equals to the first time interval;
 the mail parameter obtaining module is adapted to obtain the mail popping time and the mail popping identity every second time interval; and
 the determining module is adapted to determining whether the mail popping time is earlier than a current time and whether the mail popping identity indicates that the E-mail is not popped from the first mailbox, and send the executing command when the mail popping time is earlier than the current time and the mail popping identity indicates that the E-mail is not popped from the first mailbox.

15. The system of claim 14, wherein the POP automatic server further comprises:
 a first updating module, adapted to set the mail popping identity as indicating that the E-mail is being popped from the first mailbox after starting to pop the E-mail;
 an inquiring module, adapted to inquire whether the E-mail has been popped from the first mailbox every third time interval, and send an updating command if the E-mail has been popped from the first mailbox; and
 a second updating module, adapted to receive the updating command, set the mail popping identity as indicating that the E-mail is not popped from the first mailbox, and obtain next mail popping time by adding the first time interval to the mail popping time.

16. A server for popping an E-mail, the server comprising:
 a mailbox information storing module, adapted to store information of a first mailbox, and set a mail popping rule of the first mailbox;
 a mail parameter obtaining module, adapted to obtain a mail popping parameter of the first mailbox;
 a determining module, adapted to determine whether the mail popping parameter meets the mail popping rule of the first mailbox, and send an executing command when the mail popping parameter meets the mail popping rule of the first mailbox; and
 a message sending module, adapted to receive the executing command, obtain the information of the first mailbox, and trigger a POP agent server corresponding to a second mailbox to pop an E-mail of the first mailbox by sending a triggering command containing the information of the first mailbox;
 a mail popping rule adjusting module, adapted to determine whether a mail popping result of the first mailbox meets a preset condition of adjusting the mail popping rule, and adjust the mail popping rule of the first mailbox when the mail popping result meets the preset condition of adjusting the mail popping rule;
 wherein the preset condition of adjusting the mail popping rule is to adjust the mail popping rule when the number of popped E-mails reaches a preset number of E-mails continuously for each of N times, wherein the mail popping result at least comprises the number of popped E-mails;
 wherein determining whether the mail popping result meets a preset condition of adjusting the mail popping rule comprises,
 recording a determining result when the number of the Popped E-mails is larger than or equals to the preset number of E-mails; and
 determining that the mail popping result meets the preset condition of adjusting the mail popping rule when recording the determining results continuously for N times.

17. The server of claim 16, wherein when the mail popping rule is to pop the E-mail periodically every first time interval and the mail popping parameter comprises a timing time,
 wherein the mail parameter obtaining module is adapted to obtain the timing time of the first mailbox; and
 wherein the determining module is adapted to determine whether the timing time equals to the first time interval, and send the executing command when the timing time equals to the first time interval.

18. The server of claim 16, wherein when the mail popping rule is to pop the E-mail when a network is idle, and the mail popping parameter comprises data flux in the network,
 the mail parameter obtaining module is adapted to obtain the data flux in the network; and
 the determining module is adapted to determine whether the data flux in the network is smaller than a present data flux threshold, and send the executing command when the data flux in the network is smaller than the present data flux threshold.

19. The server of claim 16, wherein when the mail popping rule is to pop the E-mail periodically every first time interval, and the mail popping parameter comprises mail popping time and a mail popping identity; an initial value of the mail popping time is set in advance and an increasing value of the mail popping time equals to the first time interval;

wherein the mail parameter obtaining module is adapted to obtain the mail popping time and the mail popping identity every second time interval; and wherein the determining module is adapted to determine whether the mail popping time is earlier than a current time and whether the mail popping identity indicates that the E-mail is not popped from the first mailbox, and send the executing command when the mail popping time is earlier than the current time and the mail popping identity indicates that the E-mail is not popped from the first mailbox; and the server further comprising:

a first updating module, adapted to set the mail popping identity as indicating that the E-mail is being popped from the first mailbox after starting to pop the E-mail;

an inquiring module, adapted to inquire whether the E-mail has been popped from the first mailbox every third time interval, and send an updating command if the E-mail has been popped from the first mailbox; and a second updating module, adapted to receive the updating command, set the mail popping identity as indicating that the E-mail is not popped from the first mailbox, and obtain next mail popping time by adding the first time interval to the mail popping time.

\* \* \* \* \*